US007796683B2

(12) United States Patent
Rofougaran (10) Patent No.: US 7,796,683 B2
(45) Date of Patent: Sep. 14, 2010

(54) RF TRANSCEIVER WITH POWER OPTIMIZATION

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 812 days.

(21) Appl. No.: 11/529,056

(22) Filed: Sep. 28, 2006

(65) Prior Publication Data
US 2008/0080597 A1 Apr. 3, 2008

(51) Int. Cl.
*H04B 1/38* (2006.01)
*H04L 5/16* (2006.01)

(52) U.S. Cl. .................. 375/219; 375/297; 455/206
(58) Field of Classification Search .............. 375/295, 375/297, 316, 219; 455/206, 307
See application file for complete search history.

(56) References Cited

U.S. PATENT DOCUMENTS

| 5,708,681 | A * | 1/1998 | Malkemes et al. .......... 375/297 |
| 5,758,275 | A * | 5/1998 | Cox et al. ................... 455/307 |
| 5,832,389 | A * | 11/1998 | Dent ....................... 455/562.1 |
| 5,974,101 | A * | 10/1999 | Nago ........................ 375/350 |
| 5,978,362 | A * | 11/1999 | Lee et al. ................... 370/315 |
| 6,035,213 | A * | 3/2000 | Tokuda et al. ............ 455/553.1 |
| 6,151,354 | A * | 11/2000 | Abbey ........................ 375/211 |
| 6,721,368 | B1* | 4/2004 | Younis et al. ............... 375/295 |
| 6,970,717 | B2* | 11/2005 | Behrens et al. ........... 455/553.1 |
| 7,010,025 | B1* | 3/2006 | Helfenstein et al. ......... 375/219 |
| 7,251,503 | B2* | 7/2007 | Shirakata et al. ......... 455/562.1 |
| 7,289,574 | B2* | 10/2007 | Parolari ...................... 375/295 |
| 7,315,564 | B2* | 1/2008 | McCorkle ................... 375/130 |
| 7,428,426 | B2* | 9/2008 | Kiran et al. ................. 455/522 |
| 7,502,410 | B2* | 3/2009 | McCorkle et al. ........... 375/224 |
| 2002/0057751 | A1* | 5/2002 | Jagger et al. ................ 375/346 |
| 2002/0064245 | A1* | 5/2002 | McCorkle .................... 375/346 |
| 2002/0159503 | A1* | 10/2002 | Ramachandran ............ 375/146 |
| 2002/0193140 | A1* | 12/2002 | Behrens et al. ............. 455/553 |
| 2002/0197971 | A1* | 12/2002 | Cho .......................... 455/255 |
| 2003/0156668 | A1* | 8/2003 | Atkinson et al. ............ 375/345 |
| 2004/0081248 | A1* | 4/2004 | Parolari ...................... 375/259 |
| 2004/0161242 | A1* | 8/2004 | Xu ............................. 398/149 |
| 2005/0117664 | A1* | 6/2005 | Adan et al. ................. 375/316 |
| 2005/0215204 | A1* | 9/2005 | Wallace et al. ............... 455/78 |

(Continued)

FOREIGN PATENT DOCUMENTS

WO    WO 98/11674   * 3/1998

*Primary Examiner*—Temesghen Ghebretinsae
(74) *Attorney, Agent, or Firm*—Garlick Harrison & Markison; Timothy W. Markison (57) ABSTRACT

An RF transceiver includes a low noise amplifier module, a blocking circuit, a down-conversion module, a processing module, an up-conversion module, and a power amplifier module. The low noise amplifier module amplifies inbound RF signals. The blocking circuit, when enabled, substantially attenuates a blocking signal and passes, substantially unattenuated, desired receive RF signals of the inbound RF signals. The down-conversion module converts the amplified inbound RF signals or the desired receive RF signals into inbound baseband or low IF signals. The processing module converts the inbound baseband or low IF signals into inbound data, converts outbound data into outbound baseband or low IF signals, determines a transmit power level, and determines whether to enable the blocking circuit based on the transmit power level. The up-conversion module converts the outbound baseband or low IF signals into outbound RF signals, which are amplified by the power amplifier module.

17 Claims, 7 Drawing Sheets

U.S. PATENT DOCUMENTS

| | | | |
|---|---|---|---|
| 2006/0141973 A1* | 6/2006 | Behrens et al. | 455/313 |
| 2007/0025456 A1* | 2/2007 | McCrady | 375/260 |
| 2007/0053414 A1* | 3/2007 | Payne et al. | 375/141 |
| 2007/0076782 A1* | 4/2007 | McCorkle et al. | 375/130 |
| 2007/0076813 A1* | 4/2007 | Haartsen | 375/285 |
| 2007/0076827 A1* | 4/2007 | Beamish et al. | 375/345 |
| 2007/0153878 A1* | 7/2007 | Filipovic | 375/147 |
| 2007/0207743 A1* | 9/2007 | Rofougaran et al. | 455/73 |
| 2007/0291823 A1* | 12/2007 | Ben-Bassat | 375/141 |
| 2008/0009258 A1* | 1/2008 | Safarian et al. | 455/307 |
| 2008/0318533 A1* | 12/2008 | Rofougaran et al. | 455/73 |

* cited by examiner

RF TRANSCEIVER WITH POWER OPTIMIZATION

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to radio frequency (RF) transceivers used within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

For a receiver to reliably recover data from received inbound RF signals it must be able to isolate desired signal components of the inbound RF signals from interferers (e.g., interference from adjacent channel(s), interference from other devices and/or systems using frequencies near the frequency band of interest, and/or transmission blocking signals that occur in RFID systems). For example, in a cellular system, it is fairly common to have significant nearby interferers of the frequency band of interest (e.g., one or more desired channel(s) of 5-60 MHz centered at a frequency of about 900 MHz, 1800 MHz, 1900 MHz, and/or 2100 MHz) that adversely affect the ability of a receiver to accurately recover data.

One solution to reduce the adverse affects caused by interferers is to use an off-chip band pass filter (BPF) prior to the LNA to attenuate the interferers and pass the desired channel(s). However, with nearby interferers (e.g., within 100 MHz), the BPF needs a steep roll off to sufficiently attenuate the interferers making it an expensive part. In addition, an off-chip BPF typically reduces the magnitude of the desired channel(s) by about 3 dB. Another solution is to use a less expensive BPF with less roll off. While this reduces the cost and the attenuation of the desired channel(s), it does not sufficiently attenuate large nearby interferers.

Another issue with attenuating the interferers is power consumption. The above mentioned techniques to attenuate the interferers consume power. The power consumption is an acceptable loss when the interferers are of sufficient energy to significantly affect the desired operation of the receiver. However, when the interferers do not significantly affect the desired operation of the receiver, the power consumption may not be an acceptable loss.

Therefore, a need exists for a radio transceiver that optimizes power consumption by selectively attenuated interferers.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
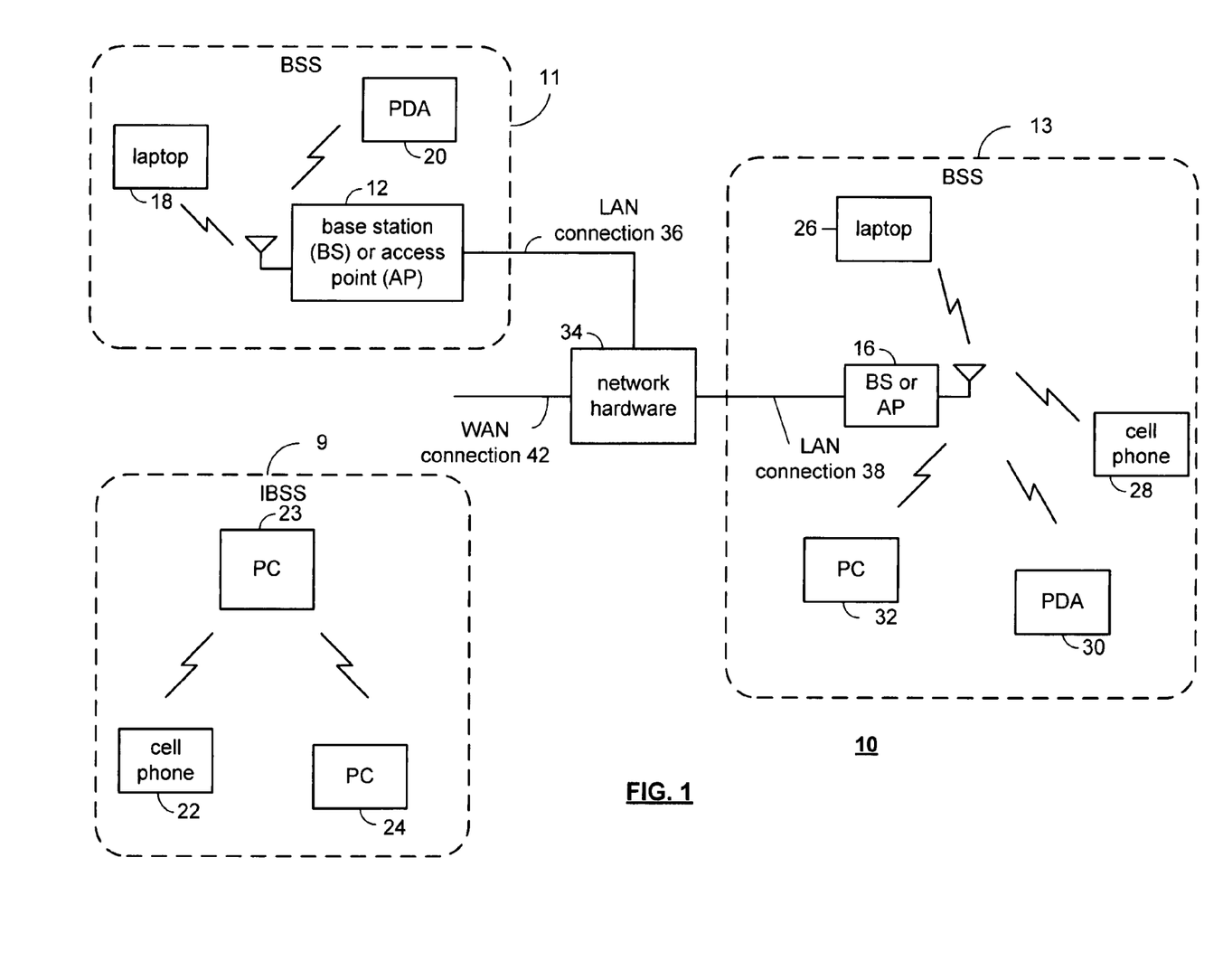
FIG. 1 is a schematic block diagram of a wireless communication system in accordance with the present invention.

FIG. 1 illustrates a schematic block diagram of a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an RF transceiver, which may be included in the wireless communication devices, will be described in greater detail with reference to one or more FIGS. 2-11.

The base stations or access points 12 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
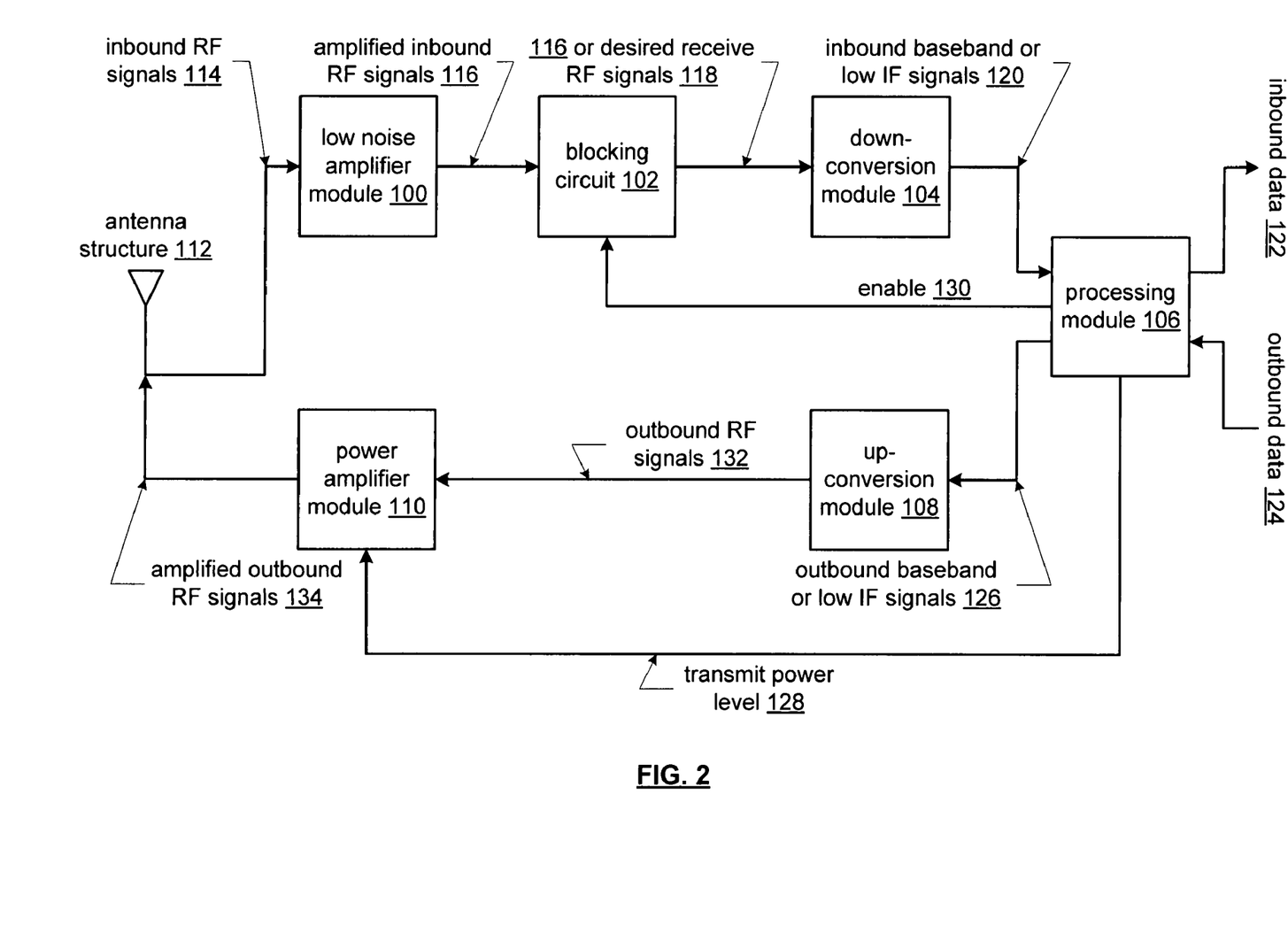
FIG. 2 is a schematic block diagram of an embodiment of a radio frequency (RF) transceiver in accordance with the present invention.

FIG. 2 is a schematic block diagram of an embodiment of a radio frequency (RF) transceiver that includes a low noise amplifier module 100, a blocking circuit 102, a down-conversion module 104, a processing module 106, an up-conversion module 108, and a power amplifier module 110. The processing module 106 may be a may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 106 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 106 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry.

In operation, the low noise amplifier (LNA) module 100, which may include one or more amplifiers, amplifies inbound RF signals 114 to produce amplified inbound RF signals 116. In one embodiment, the inbound RF signals 114 have a carrier frequency within a receive frequency band (e.g., 890-915 MHz, 1920-1980 MHz. etc.). The blocking circuit 102, when enabled 130, substantially attenuates a blocking signal and passes, substantially unattenuated, desired receive RF signals 118 of the inbound RF signals 116. When the blocking circuit is not enabled 130, the amplified inbound RF signals 116 are passed by the blocking circuit 102 to the down conversion module 104. Note that the blocking signal may correspond to the amplified outbound RF signal 134 being received via the LNA module 100.

The down-conversion module 104, which includes one or more mixers, converts the amplified inbound RF signals 116 or the desired receive RF signals 118 into inbound baseband or low intermediate frequency (IF) signals 120. This may be done by mixing the amplified inbound RF signals 116 or the desired receive RF signals 118 with a local oscillation. Note that the baseband or low IF signals 120 may be digital baseband signals (e.g., have a zero IF) or digital low IF signals, where the low IF typically will be in a frequency range of one hundred kilohertz to a few megahertz.

The processing module 106 converts the inbound baseband or low IF signals 120 into inbound data 122. Such a conversion includes processing that is in accordance with one or more wireless communication standard (e.g., IEEE 802.11, Bluetooth, RFID, GSM, CDMA, et cetera). The processing includes, but is not limited to, digital intermediate frequency to baseband conversion, demodulation, demapping, depuncturing, decoding, and/or descrambling.

The processing module 106 also converts outbound data 124 into outbound baseband or low IF signals 126. Such a conversion includes processing that is in accordance with one or more wireless communication standard (e.g., IEEE 802.11, Bluetooth, RFID, GSM, CDMA, et cetera). The processing includes, but is not limited to, scrambling, encoding, puncturing, mapping, modulation, and/or digital baseband to IF conversion.

The processing module 106 also determine a transmit power level 128, which may range from −50 dB to +28 dB. Based on the transmit power level, the processing module 106 determines whether to enable the blocking circuit 102. Note that when the transmit power level is low (e.g., less than −10 dB), the processing module 106 may not enable the blocking circuit 102 since the resulting blocking signal is not of significant energy to substantially affect the receiver side from accurately recovering the inbound data from the inbound RF signals 114, which includes the desired receive RF signals and the blocking signal. When the transmit power level is the low threshold (e.g., less than −10 dB), the processing module 106 may determine to enable the blocking circuit 102. In addition, the processing module 106 may determined to adjust linearity of one or more of the low noise amplifier module 100, the down-conversion module 102, the up-conversion module 108, the power amplifier module 110 when the transmit power level is above a threshold (e.g., 0 dB).

The up-conversion module 108, which includes one or more mixers, converts the outbound baseband or low IF signals 126 into outbound RF signals 132. This may be done by mixing the outbound baseband or low IF signals 126 with a local oscillation. The power amplifier module 110 amplifies the outbound RF signals 132 based on the transmit power level 128 to produce amplified outbound RF signals 134, which have a carrier frequency in a transmit band (e.g., 935-960 MHz, 2110-2170 MHz, etc). The antenna structure 112, which may include one or more antennas, a diversity antenna structure, etc., transmits the amplified outbound RF signals 134.

Figure 3:
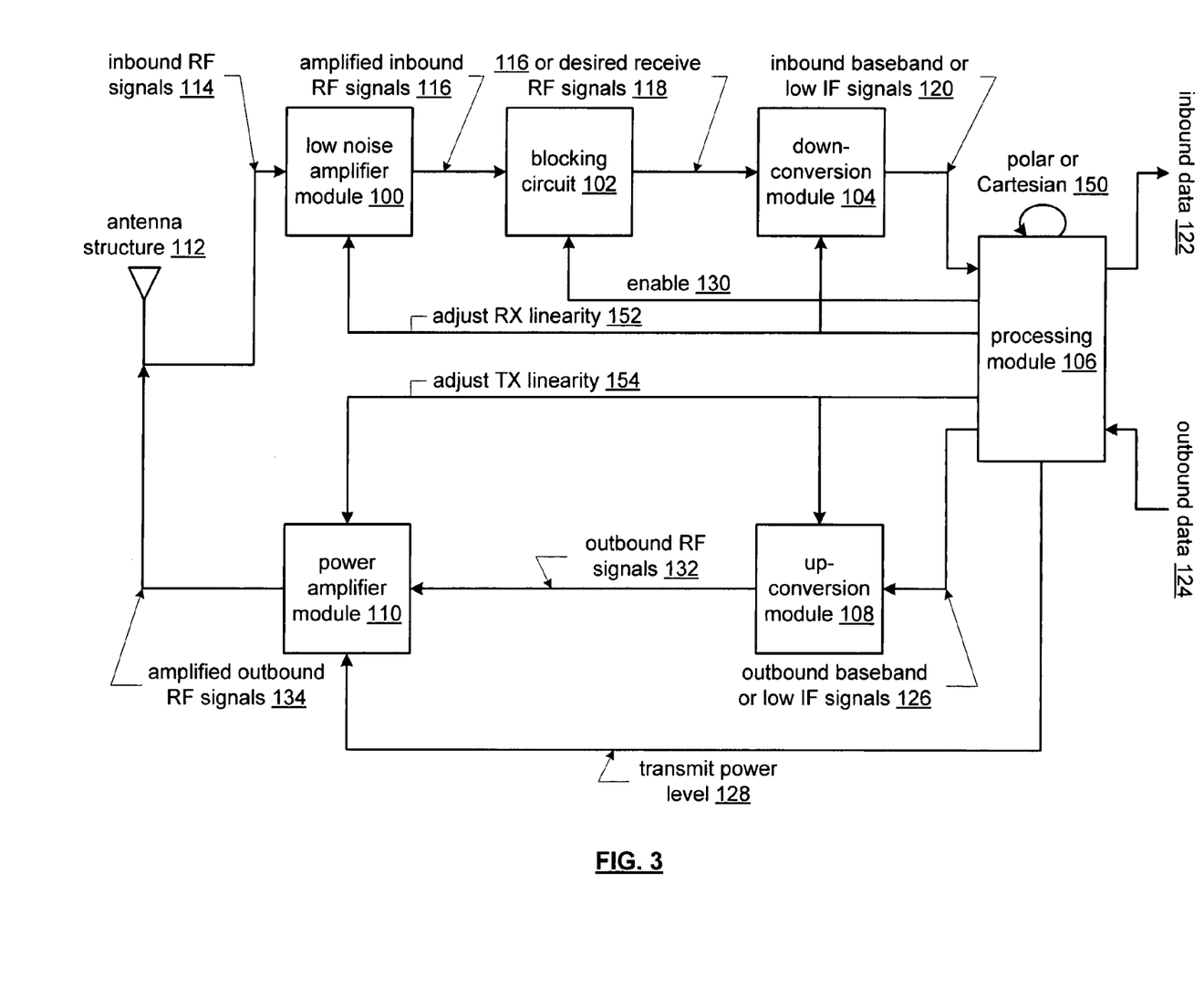
FIG. 3 is a schematic block diagram of another embodiment of a radio frequency (RF) transceiver in accordance with the present invention.

FIG. 3 is a schematic block diagram of another embodiment of a radio frequency (RF) transceiver that includes a low noise amplifier module 100, a blocking circuit 102, a down-conversion module 104, a processing module 106, an up-conversion module 108, and a power amplifier module 110.

In operation, the low noise amplifier (LNA) module 100 amplifies inbound RF signals 114 to produce amplified inbound RF signals 116. In one embodiment, the linearity of the LNA module 100 may be adjusted in accordance with an adjust RX linearity signal 152 from the processing module 106. The linearity of the LNA module 100 may be adjusted by changing the supply voltage, the supply current, and/or the biasing.

The blocking circuit 102, when enabled 130, substantially attenuates a blocking signal and passes, substantially unattenuated, desired receive RF signals 118 of the inbound RF signals 116. When the blocking circuit is not enabled 130, the amplified inbound RF signals 116 are passed by the blocking circuit 102 to the down conversion module 104.

The down-conversion module 104 converts the amplified inbound RF signals 116 or the desired receive RF signals 118 into inbound baseband or low intermediate frequency (IF) signals 120. In one embodiment, the linearity of the down conversion module 104 may be adjusted in accordance with an adjust RX linearity signal 152 from the processing module 106. The linearity of the down conversion module 104 may be adjusted by changing the supply voltage, the supply current, and/or the biasing.

The processing module 106 determines whether to enable the blocking circuit 102, adjust the linearity of the LNA module 100, the down conversion module 104, the up conversion module 108, and/or the power amplifier module 110. Such a determination is based on the transmit power level 128 and how much interference with the receiver side will result. As the transmit power level increases, the frequency spectrum increases as does the magnitude, making the blocking signal more and more difficult to sufficiently attenuate. If the blocking circuit is enabled, but further headroom is needed, the linearity of the power amplifier may be increased, which reduces the spreading of the frequency spectrum of the outbound RF signals. If this is not enough, the linearity of the up conversion module 108, the LNA module 100, and/or the down-conversion module 104 may also be adjusted. As alternative, the processing module 106 may shift from a Cartesian based system to a Polar based system 150.

The up-conversion module 108 converts the outbound baseband or low IF signals 126 into outbound RF signals 132. In one embodiment, the linearity of the up conversion module 108 may be adjusted in accordance with an adjust TX linearity signal 154 from the processing module 106. The linearity of the up conversion module 108 may be adjusted by changing the supply voltage, the supply current, and/or the biasing.

The power amplifier module 110 amplifies the outbound RF signals 132 based on the transmit power level 128 to produce amplified outbound RF signals 134, which are transmitted by the antenna structure 112. In one embodiment, the linearity of the power amplifier module 110 may be adjusted in accordance with an adjust TX linearity signal 154 from the processing module 106. The linearity of the power amplifier module 110 may be adjusted by changing the supply voltage, the supply current, and/or the biasing.

Figure 4:
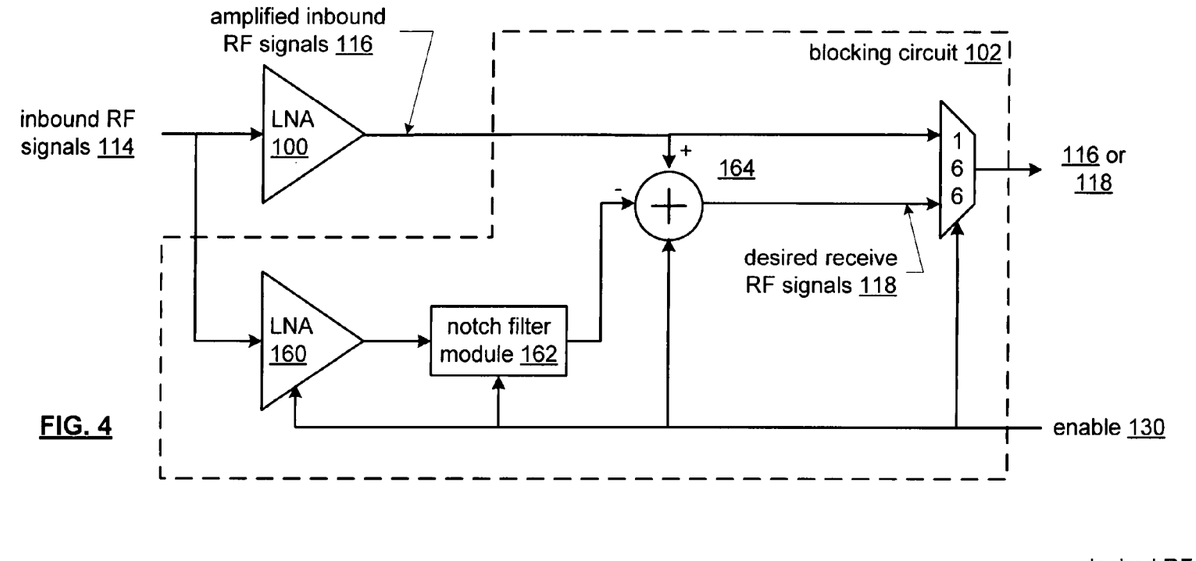
FIG. 4 is a schematic block diagram of an embodiment of a low noise amplifier and blocking circuit in accordance with the present invention.

FIG. 4 is a schematic block diagram of an embodiment of the low noise amplifier 100 and the blocking circuit 102. The blocking circuit 102 includes a low noise amplifier 160, a notch filter module 162, a subtraction module 164, and a multiplexer 166. In this embodiment, when the blocking circuit is enabled 130, LNA 160, the notch filtering module 162 and the subtraction module 164 are active and the output of the subtraction module 164 is outputted as the desired receive RF signals 118 by the multiplexer 166. When the blocking circuit is not enabled 130, LNA 160, the notch filtering module 162 and the subtraction module 164 are inactive (which may be done by removing power, placing the devices is a high impedance state or any other method for disabling a circuit) and the amplified inbound RF signals 116 are outputted by the multiplexer 166.

Figure 5A:
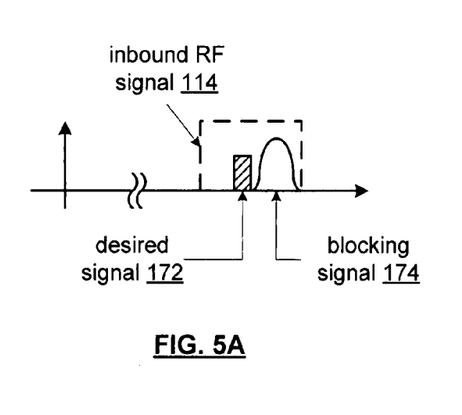
FIGS. 5A-5C are frequency domain diagrams of signals being processed by the embodiment of FIG. 4.
Figure 5B:
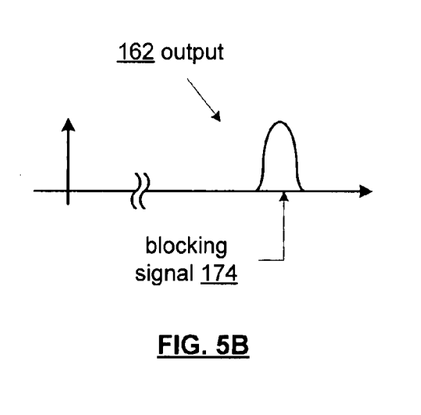

When the blocking circuit 102 is enabled 130, the LNA 160 amplifies the inbound RF signals 114 at a similar gain setting as the LNA 100. The notch filter module 162, which may include an inductive-capacitive tank circuit, comb filter, or other construct, filters the amplified inbound RF signals to attenuate the desired signals and to pass the blocking signal. With reference to FIGS. 5A and 5B, the inbound RF signal 114 is shown to include a desired signal 172 and a blocking signal 174. The notch filter module 162 attenuates the desired signal 172 and passes the blocking signal 174, which is shown in FIG. 5B as being amplified with respect to the inbound RF signal 114 of FIG. 5A.

Figure 5C:
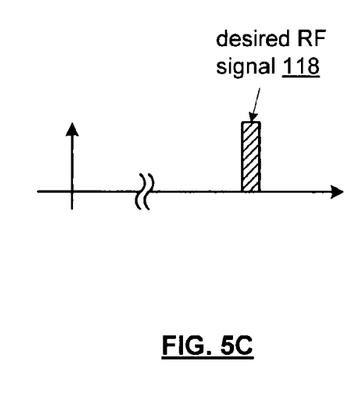

Returning to the discussion of FIG. 4, the subtraction module 164 subtracts the notched filtered signal (i.e., the blocking signal 174) from the amplified inbound RF signals 116 to produce the desired receive RF signals 118. FIG. 5C illustrates a frequency domain representation of the desired receive RF signals 118.

Figure 6:
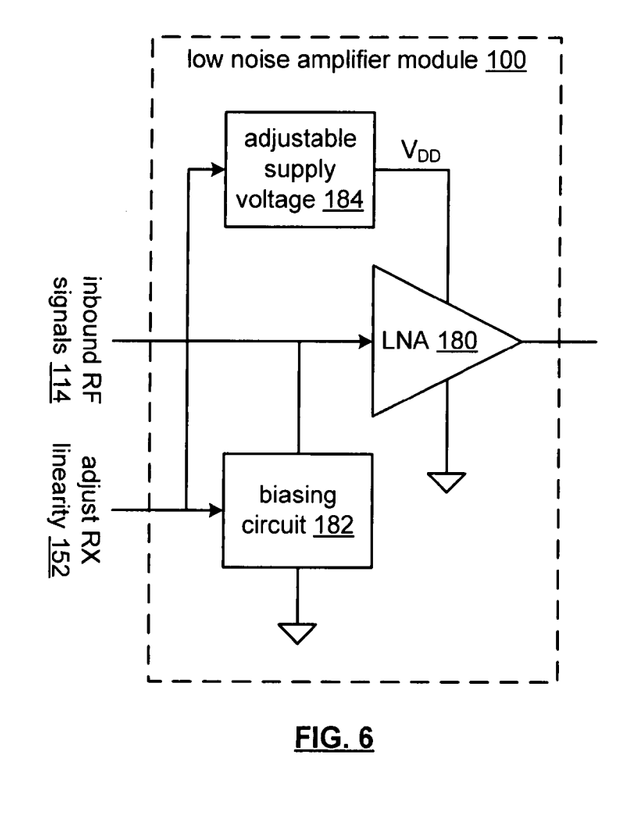
FIG. 6 is a schematic block diagram of an embodiment of a low noise amplifier in accordance with the present invention.

FIG. 6 is a schematic block diagram of an embodiment of the low noise amplifier 100 that includes a low noise amplifier 180, a biasing circuit 182, and an adjustable supply voltage 184. In this embodiment, the LNA 180 amplifies the inbound RF signals 114 based on the biasing provided by the biasing circuit 182 and the supply voltage (VDD) provided by the adjustable supply voltage 184. Since the LNA 180 primarily consists of transistors, increasing its supply voltage extends the LNA's linearity range. Further, by adjusting the biasing level, the gain of the LNA is extended. By extending the linearity range and/or gain of the LNA 180, it is less susceptible to interference from the blocking signal 174. Note that the biasing circuit 182 and the adjustable supply voltage 184 are adjusted in accordance with the adjust RX linearity signal 152.

Figure 7:
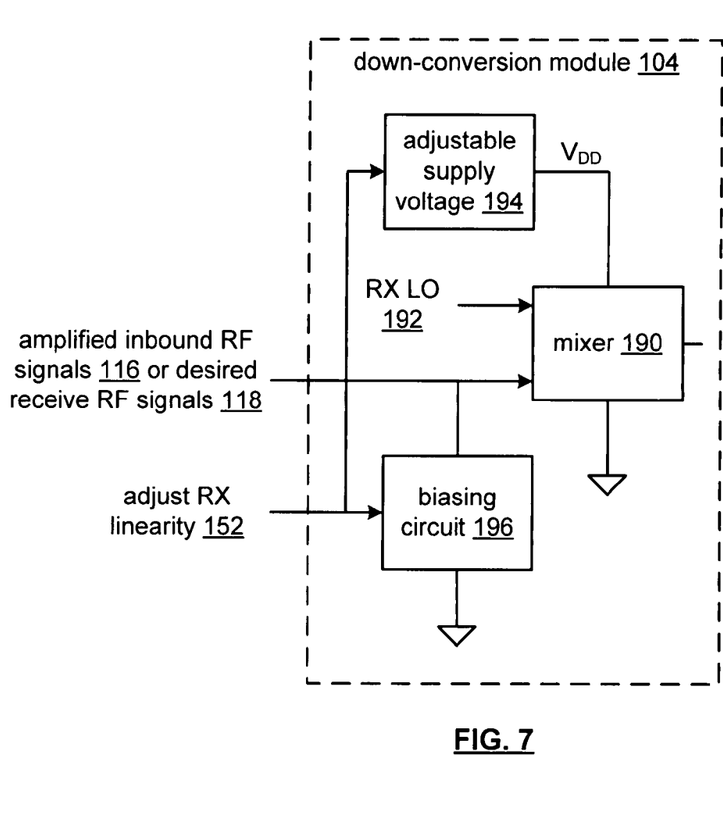
FIG. 7 is a schematic block diagram of an embodiment of a down-conversion module in accordance with the present invention.

FIG. 7 is a schematic block diagram of an embodiment of the down-conversion module 104 that includes a mixer 190, a biasing circuit 196, and an adjustable supply voltage 194. The mixer 190, which may include multiple mixers for mixing in-phase and quadrature components of the amplified inbound RF signals 116 or the desired received RF signals 118, mixes the amplified inbound RF signals 116 or the desired received RF signals 118 with a receive local oscillation (RX LO) 192 in accordance with the biasing provided by the biasing circuit 196 and the supply voltage provided by the adjustable supply voltage 194. Since the mixer 190 primarily consists of transistors, increasing its supply voltage extends the mixer's linearity range. Further, by adjusting the biasing level, the gain of the mixer is extended. Thus, by extending the linearity range and/or gain of the mixer 190, it is less susceptible to interference from the blocking signal 174. Note that the biasing circuit 196 and the adjustable supply voltage 194 are adjusted in accordance with the adjust RX linearity signal 152.

Figure 8:
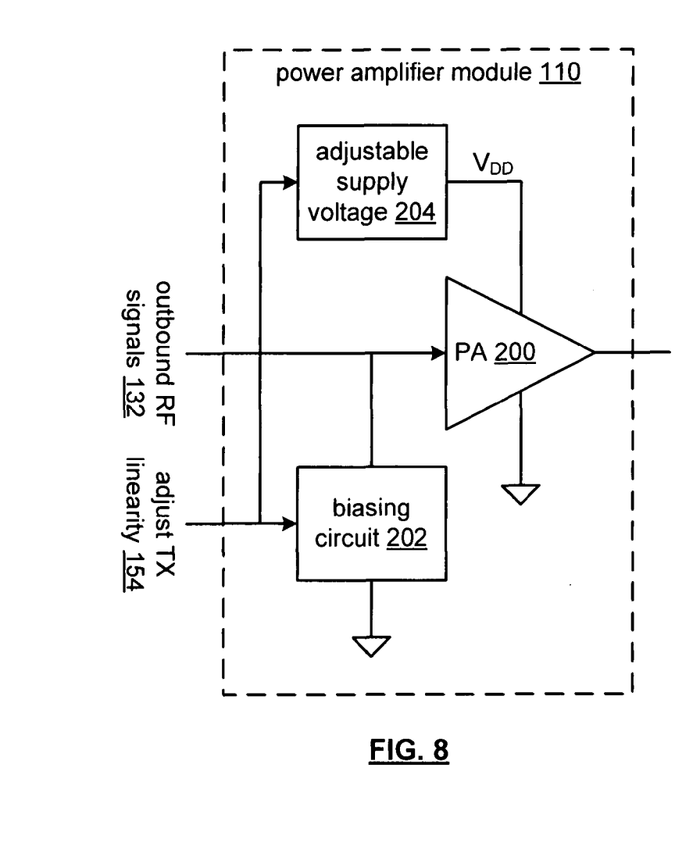
FIG. 8 is a schematic block diagram of an embodiment of a power amplifier in accordance with the present invention.

FIG. 8 is a schematic block diagram of an embodiment of the power amplifier module 110 that includes a power amplifier (PA) 200, a biasing circuit 202, and an adjustable supply voltage 204. In this embodiment, the PA 200 amplifies the outbound RF signals 132 based on the biasing provided by the biasing circuit 202 and the supply voltage (VDD) provided by the adjustable supply voltage 204. Since the PA 200 primarily consists of transistors, increasing its supply voltage extends the PA's linearity range. Further, by adjusting the biasing level, the gain of the PA is extended. By extending the linearity range and/or gain of the PA 200, it produces a narrow frequency spectrum amplified outbound RF signal 134 which provides less interference to the receiver path. Note that the biasing circuit 202 and the adjustable supply voltage 204 are adjusted in accordance with the adjust TX linearity signal 154.

Figure 9:
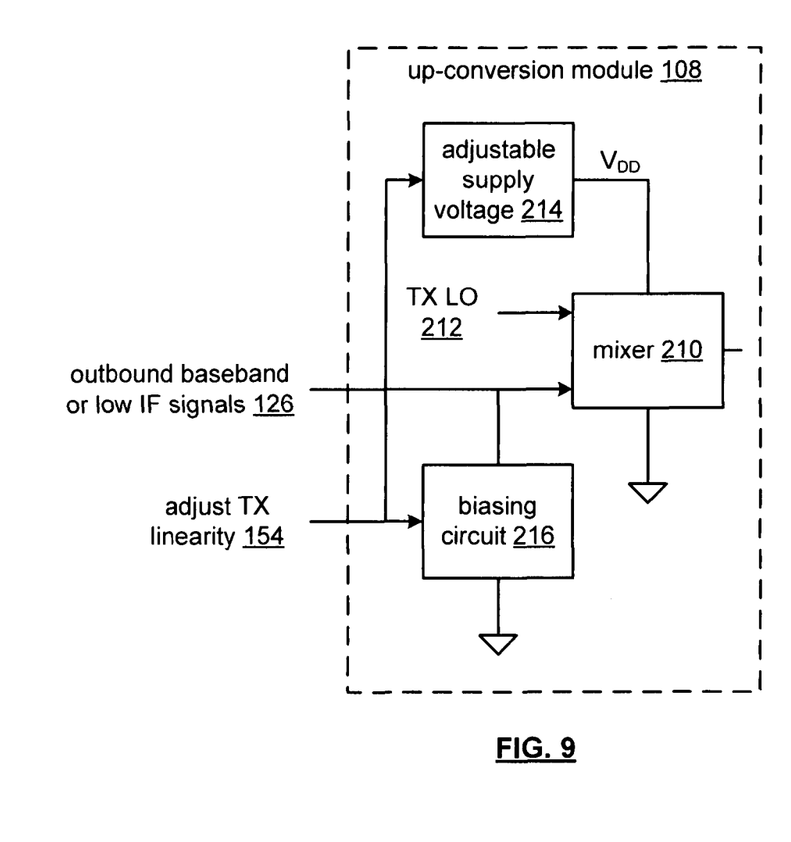
FIG. 9 is a schematic block diagram of an embodiment of an up-conversion module in accordance with the present invention.

FIG. 9 is a schematic block diagram of an embodiment of the up-conversion module 108 that includes a mixer 210, a biasing circuit 216, and an adjustable supply voltage 214. The mixer 210, which may include multiple mixers for mixing in-phase and quadrature components of the outbound baseband or low IF signals 126, mixes the outbound baseband or low IF signals 126 with a transmit local oscillation (TX LO) 212 in accordance with the biasing provided by the biasing circuit 216 and the supply voltage provided by the adjustable supply voltage 214. Since the mixer 210 primarily consists of transistors, increasing its supply voltage extends the mixer's linearity range. Further, by adjusting the biasing level, the gain of the mixer is extended. Thus, by extending the linearity range and/or gain of the mixer 210, it produces a narrow frequency spectrum outbound RF signal 132 which provides less interference to the receiver path. Note that the biasing circuit 216 and the adjustable supply voltage 214 are adjusted in accordance with the adjust TX linearity signal 154.

Figure 10:
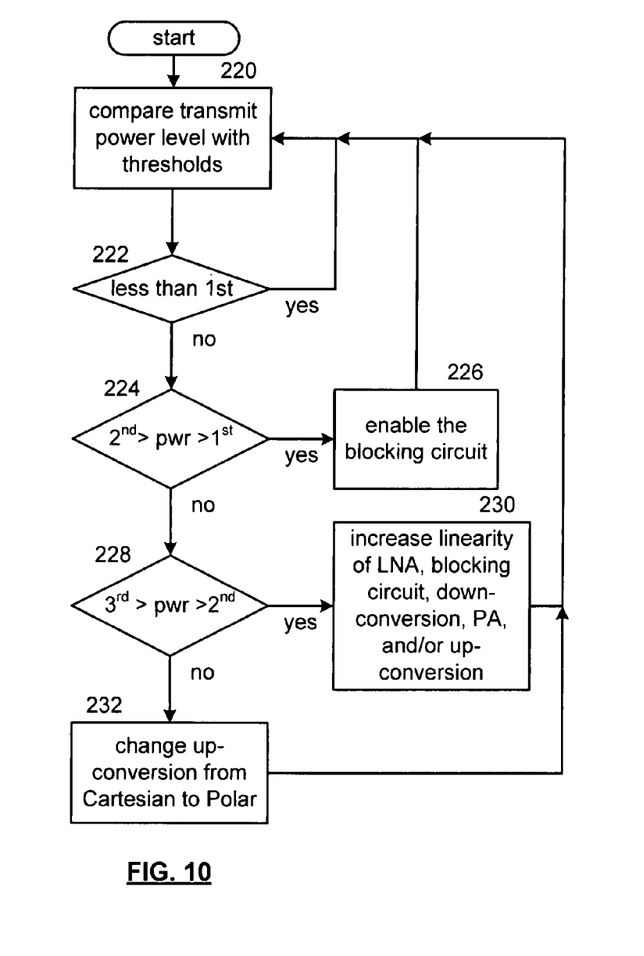
FIG. 10 is a logic diagram of a method for optimizing power consumption of an RF transceiver in accordance with the present invention.

FIG. 10 is a logic diagram of a method for optimizing power consumption of an RF transceiver that begins at step 220, where the processing module 106 compares the transmit power level with a first, second, and/or third thresholds. If the transmit power level is below the first threshold, the process repeats at step 220 with the blocking circuit disabled.

If the transmit power level is greater than the first threshold but less than the second, the process proceeds to step 226, where the blocking circuit is enabled. If the transmit power level is greater than the second threshold but less than the third threshold, the process proceeds to step 230 where linearity of at least one of the low noise amplifier module, the blocking circuit, the down conversion module, the up conversion module, and/or the power amplifier module is increased.

If the transmit power level is greater than the third threshold, the processing module changes the conversion of the outbound data into outbound baseband or low IF signals from a Cartesian coordinate scheme to a Polar coordinate scheme. Refer to co-pending patent applications entitled HYBRID RADIO FREQUENCY TRANSMITTER, having a Ser. No. of 11/388,822, and a filing date of Mar. 24, 2006 and entitled PROGRAMMABLE HYBRID TRANSMITTER, having a Ser. No. of 11/494,682, and a filing date of Jul. 26, 2006.

Figure 11:
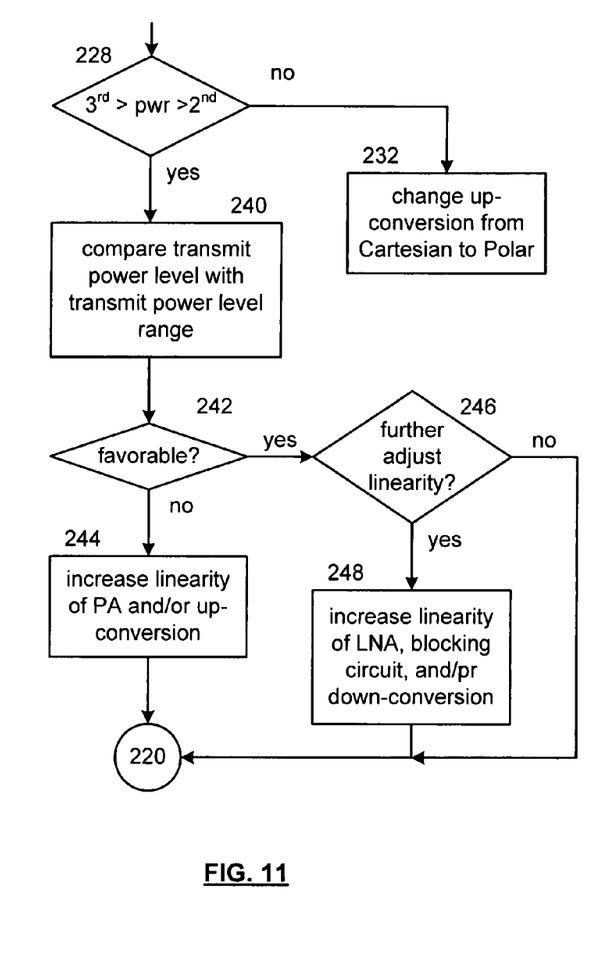
FIG. 11 is a logic diagram of another method for optimizing power consumption of an RF transceiver in accordance with the present invention.

FIG. 11 is a logic diagram of another method for optimizing power consumption of an RF transceiver which continues the method of FIG. 10 at step 228. If the transmit power level is between the second and third thresholds, the process proceeds to step 240 where the processing module compares the transmit power level with a transmit power level range. When the transmit power level is not within most probable transmit power level settings of the transmit power level range, the process proceeds to step 244 where the linearity of the power amplifier module and/or the up-conversion module is increased.

When the transmit power level is within the most probable transmit power level settings of the transmit power level range, process proceeds to step 246 where the processing module determines whether further adjustments are needed. Such a determination may be made based on many factors including, but not limited to, signal to noise ratio, bit error rate, cyclic redundancy check, dropped packet rate. If no further adjustments are needed, the process continues at step 220. If, however, further adjustments are needed, the process proceeds to step 248 where linearity of the low noise amplifier module, the blocking circuit, and/or the down conversion module is increased. The process then repeats at step 220.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) transceiver comprises:
a low noise amplifier module coupled to amplify inbound RF signals to produce amplified inbound RF signals, wherein the inbound RF signals have a carrier frequency within a receive frequency band;
a blocking circuit, when enabled, operable to substantially attenuate a blocking signal and to pass, substantially unattenuated, desired receive RF signals;
a down-conversion module coupled to convert the amplified inbound RF signals or the desired receive RF signals into inbound baseband or low intermediate frequency (IF) signals;
processing module coupled to:
convert the inbound baseband or low IF signals into inbound data;
convert outbound data into outbound baseband or low IF signals;
determine a transmit power level;
determine whether to enable the blocking circuit based on the transmit power level;
an up-conversion module coupled to convert the outbound baseband or low IF signals into outbound RF signals; and
a power amplifier module coupled to amplify the outbound RF signals based on the transmit power level to produce amplified outbound RF signals, wherein the blocking signal corresponds to the amplified outbound RF signals.

2. The RF transceiver of claim 1, wherein the processing module is further coupled to:
determine whether to increase linearity of at least one of: the low noise amplifier module, the blocking circuit, and the down-conversion module based on the transmit power level.

3. The RF transceiver of claim 1, wherein the processing module is further coupled to:
determine whether to increase linearity of at least one of: the power amplifier module and the up-conversion module based on the transmit power level.

4. The RF transceiver of claim 3, wherein the processing module is further coupled to:
compare the transmit power level with a transmit power level range; and
when the transmit power level is not within most probable transmit power level settings of the transmit power level range, increase linearity of the at least one of: the power amplifier module and the up-conversion module.

5. The RF transceiver of claim 1, wherein the processing module is further coupled to:
determine whether to change the conversion of the outbound data into outbound baseband or low IF signals from a Cartesian coordinate scheme to a Polar coordinate scheme based on the transmit power level.

6. The RF transceiver of claim 1, wherein the processing module is further coupled to determine whether to enable the blocking circuit by:
comparing the transmit power level with a first threshold; and
when the transmit power level compares unfavorably with the first threshold, enable the blocking circuit.

7. The RF transceiver of claim 6, wherein the processing module is further coupled to:
compare the transmit power level to a second threshold; and
when the transmit power level compares unfavorably to the second threshold, increase linearity of at least one of: the low noise amplifier module, the blocking circuit, the down-conversion module, the power amplifier module, and the up-conversion module.

8. The RF transceiver of claim 7, wherein the processing module is further coupled to increase the linearity by:
adjusting at least one of supply voltage and supply current available to the at least one of the low noise amplifier module, the blocking circuit, the down-conversion module, the power amplifier module, and the up-conversion module.

9. The RF transceiver of claim 7, wherein the processing module is further coupled to:
compare the transmit power level to a third threshold; and
when the transmit power level compares unfavorably to the third threshold, change the conversion of the outbound data into outbound baseband or low IF signals from a Cartesian coordinate scheme to a Polar coordinate scheme.

10. The RF transceiver of claim 6, wherein the processing module is further coupled to:
compare the transmit power level to a second threshold; and
when the transmit power level compares unfavorably to the second threshold, compare the transmit power level with a transmit power level range; and when the transmit power level is not within most probable transmit power level settings of the transmit power level range, increase linearity of the at least one of: the power amplifier module and the up-conversion module.

11. A radio frequency (RF) transceiver comprises:
a low noise amplifier module coupled to amplify inbound RF signals to produce amplified inbound RF signals, wherein the inbound RF signals have a carrier frequency within a receive frequency band;
a blocking circuit, when enabled, operable to substantially attenuate a blocking signal and to pass, substantially unattenuated, desired receive RF signals;
a down-conversion module coupled to convert the amplified inbound RF signals or the desired receive RF signals into inbound baseband or low intermediate frequency (IF) signals;
processing module coupled to:
 convert the inbound baseband or low IF signals into inbound data;
 convert outbound data into outbound baseband or low IF signals;
 determine a transmit power;
 determine whether to adjust linearity of at least one of: the low noise amplifier circuit, the down-conversion module, an up-conversion module, and a power amplifier module based on the transmit power level; and
 determine whether to enable the blocking circuit based on the transmit power level;
the up-conversion module coupled to convert the outbound baseband or low IF signals into outbound RF signals; and
the power amplifier module coupled to amplify the outbound RF signals based on the transmit power level to produce amplified outbound RF signals, wherein the blocking signal corresponds to the amplified outbound RF signals.

12. The RF transceiver of claim 11, wherein the processing module is further coupled to determine whether to enable the blocking circuit by:
 comparing the transmit power level with a first threshold; and
 when the transmit power level compares unfavorably with the first threshold, enable the blocking circuit.

13. The RF transceiver of claim 11, wherein the processing module is further coupled to:
 compare the transmit power level to a first threshold; and
 when the transmit power level compares unfavorably to the first threshold, increase linearity of the at least one of: the low noise amplifier module, the blocking circuit, the down-conversion module, the power amplifier module, and the up-conversion module.

14. The RF transceiver of claim 13, wherein the processing module is further coupled to increase the linearity by:
 adjusting at least one of supply voltage and supply current available to the at least one of the low noise amplifier module, the blocking circuit, the down-conversion module, the power amplifier module, and the up-conversion module.

15. The RF transceiver of claim 13, wherein the processing module is further coupled to:
 compare the transmit power level to a second threshold; and
 when the transmit power level compares unfavorably to the second threshold, change the conversion of the outbound data into outbound baseband or low IF signals from a Cartesian coordinate scheme to a Polar coordinate scheme.

16. The RF transceiver of claim 11, wherein the processing module is further coupled to:
 compare the transmit power level to a threshold; and
 when the transmit power level compares unfavorably to the threshold, compare the transmit power level with a transmit power level range; and
 when the transmit power level is not within most probable transmit power level settings of the transmit power level range, increase linearity of the at least one of: the power amplifier module and the up-conversion module.

17. The RF transceiver of claim 11, wherein the processing module is further coupled to:
 compare the transmit power level with a transmit power level range;
 when the transmit power level is within most probable transmit power level settings of the transmit power level range, determine whether an amplification setting of the power amplifier module corresponds to optimum efficiency at the transmit power level; and
 when the amplification setting of the power amplifier module does not correspond to optimum efficiency at the transmit power level, adjust the amplification setting of the power amplifier module to substantially obtain optimum efficiency at the transmit power level.

* * * * *